Nov. 18, 1930. H. W. CROWELL 1,782,002
GAUGE
Filed July 2, 1926 2 Sheets-Sheet 1
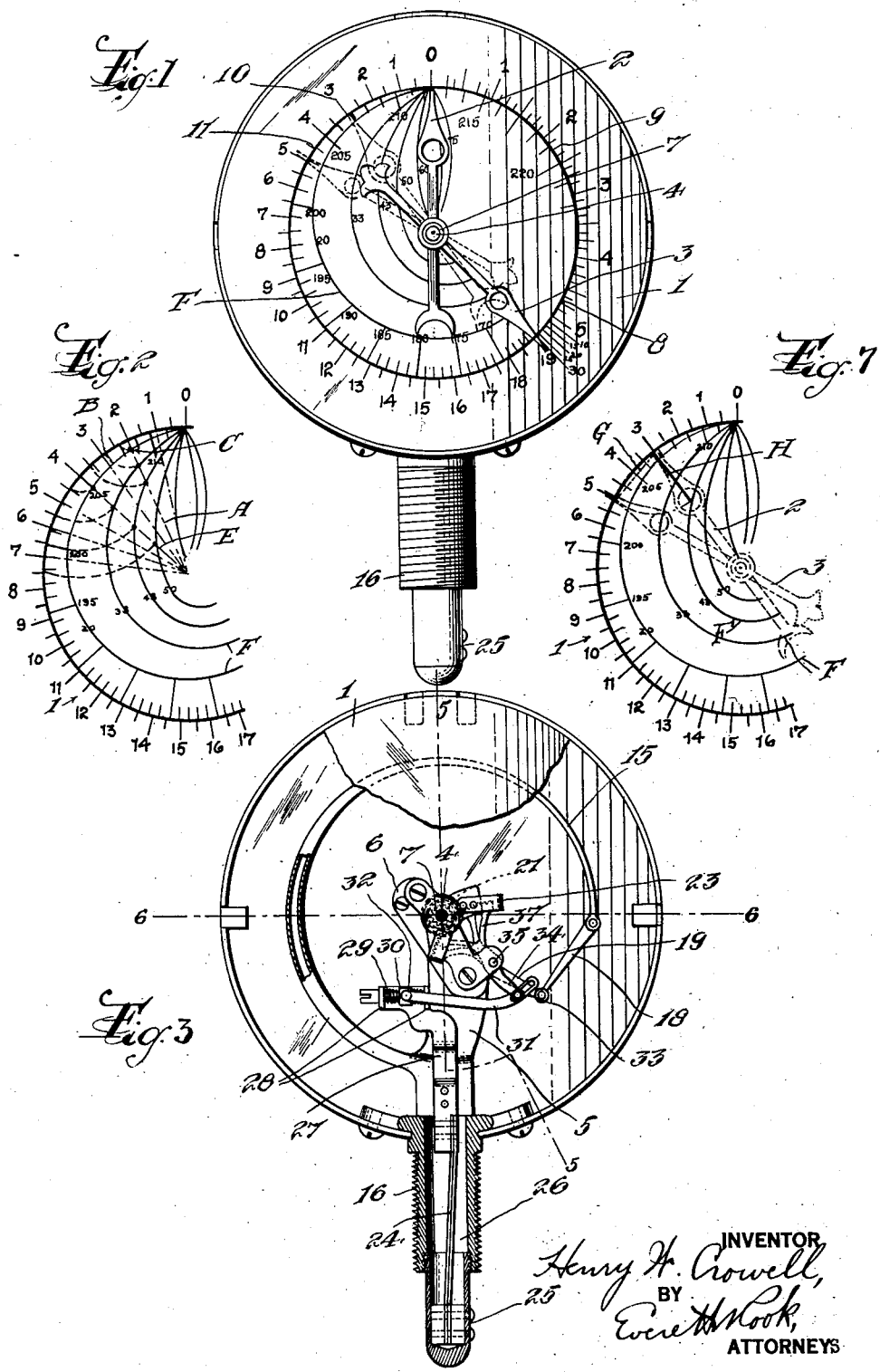
INVENTOR
Henry H. Crowell,
BY
Everett H. Cook,
ATTORNEYS

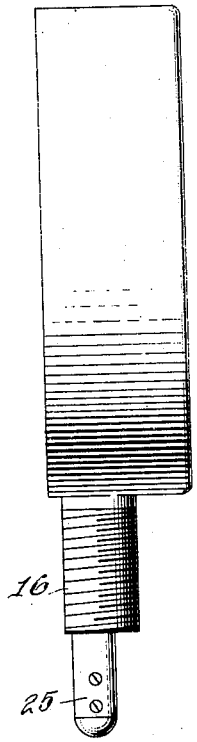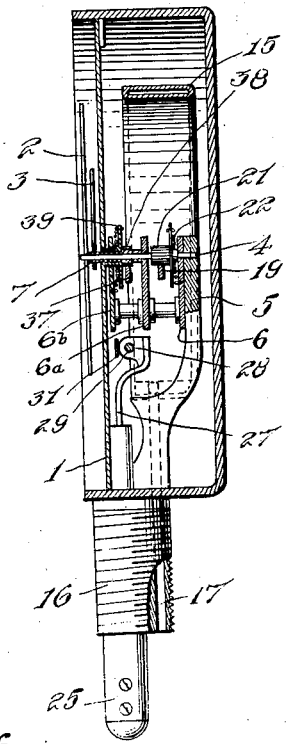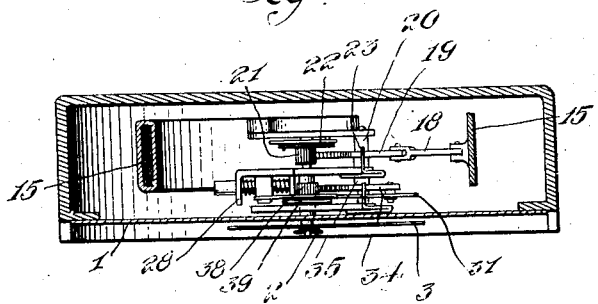

Patented Nov. 18, 1930

1,782,002

UNITED STATES PATENT OFFICE

HENRY W. CROWELL, OF GLEN RIDGE, NEW JERSEY

GAUGE

Application filed July 2, 1926. Serial No. 120,084.

This invention contemplates a gauge for indicating departures from normal of a plurality of dependent conditions which have a normally definite relation, one object of the invention being to provide a gauge which will indicate the approximate percentage of air present in a mixture of water vapor and air by relatively indicating variations in the temperature and pressure of said mixture which are dependent on the amount of air present, particularly for use on steam boilers used in connection with so-called vapor or vacuum systems.

It is known to those skilled in the art that the efficiency of operation of a vapor or vacuum heating system is reduced by the presence of air in the boiler, piping and radiators. Therefore, it is desirable to have some means for indicating the percentage of air in the piping, radiators and boiler so that any leaks or other troubles in the system can be repaired or overcome within due time, thus ensuring a continuous efficient operation of the system.

It is also well-know that water vapor at a certain temperature has a certain corresponding pressure and vice versa, and that a mixture of water vapor and air in certain relative proportions at a certain temperature has a corresponding certain pressure and vice versa. Therefore, if any two of the three above-mentioned variables (temperature, pressure, percentage of air in the mixture) be known, the remaining one can be ascertained by calculation. The relations between the temperature and pressure of a water vapor have been calculated and arranged in tabular form and plotted in a graphical form, under the designations of steam tables and the steam curve, respectively. Similarly, the relations beween temperature and pressure in a mixture of water vapor and air in certain proportions have been calculated, tabulated and plotted under the designations of saturated mixtures of air the water vapor tables and saturated mixtures of air and water vapor curves, respectively. Obviously, the variations of the two variables pressure and temperature, from the certain relations above-mentioned, will indicate the magnitude of the other variable, that is percentage of air in the mixture.

Another object of the invention is to provide a gauge of the character described embodying novel and improved features of construction whereby the percentage of air in a mixture of water vapor and air may be graphically indicated so as to be readily determined from a glance at the gauge.

Further objects are to provide in such a gauge a novel and improved construction, combination and arrangement of pressure and temperature indicating means, such as pointers, and a chart or dial having inscriptions, curves or similar designations to cooperate with the pressure and temperature indicating means for graphically indicating the percentage of air content; to provide a novel and improved chart or dial, and to obtain other results and advantages as may be brought out by the following description.

In the accompanying drawings I have shown my invention as embodied in certain details of construction, but it will be understood that this is primarily for the purpose of illustrating the principles of the invention and that the said details of construction may be modified and changed by those skilled in the art without departing from the spirit and scope of the invention.

Referring to said drawings in which corresponding and like parts are designated throughout the several views by the same reference characters, Figure 1 is a front elevation of a gauge embodying the invention.

Figure 2 is a fragmentary diagrammatic view showing the manner of laying out the curves which serve in connection with the pressure and temperature indicating means to indicate the percentage of air in the water vapor and air mixture;

Figure 3 is a front elevation partially in section of the gauge with the cover plate and dial removed;

Figure 4 is a side elevation of the gauge;

Figure 5 is a vertical longitudinal sectional view, taken on the line 5—5 of Figure 3;

Figure 6 is a horizontal sectional view, taken on the line 6—6 of Figure 3, and

Figure 7 is a fragmentary diagrammatic view showing the manner of reading the gauge to ascertain the percentage of air in the mixture.

Specifically describing the illustrated embodiment of the invention, the reference character 1 designates a substantially circular dial over which are movable the hands or pointers 2 and 3 by means of suitable pressure responsive mechanism and temperature responsive mechanism, respectively, one possible form of which is hereinafter described. These hands 2 and 3 are shown as mounted concentrically with each other and with the dial 1 and are arranged for relative movement in any known manner. In the present instance the pressure responsive hand 2 is mounted upon a spindle 4 journaled in a frame comprising a plurality of plates 6, 6$^a$, 6$^b$ secured together and to a bracket 5. The temperature responsive hand 3 is mounted upon a sleeve 7 rotatable upon and co-axially of the spindle 4.

The dial 1 has inscribed thereon a scale circle 8 concentric with the axis of the hands 2 and 3, and said scale circle is graduated on its outside for pressure above and below atmospheric, as indicated at 9 and 10, respectively, the graduation designated zero corresponding to atmospheric pressure, while the graduations at the left-hand side of the zero designation are for pressures below atmospheric and the graduations at the right-hand side of the zero designation are for pressures above atmospheric. As can be ascertained from the tables or curves hereinbefore mentioned, water vapor at a certain pressure has a corresponding certain temperature, and accordingly the inside of the scale circle 8 is graduated as at 11 according to temperature, the location of the graduations 11 relative to the pressure graduations 9 and 10 corresponding to the relations of the temperatures and pressures ascertained from the steam tables or steam curve.

Since for the purpose for which the gauge is particularly intended it is not necessary to indicate temperatures below 165 degrees F. or above 225 degrees F., the scale circle has been correspondingly graduated. As shown on the drawings, the scale circle is laid out for negative pressures from atmospheric to 19 inches of mercury, and for positive pressures, that is above atmospheric to 30 pounds. It will be observed that the graduation corresponding to 165 degrees F. corresponds substantially to the graduation indicating 19 inches of mercury, and this means that with a water vapor and no air content, when the pressure of the vapor is 19 inches of mercury, the temperature is 165 degrees F. and vice versa.

The normal position of the pressure indicating hand, that is when there is no pressure on the gauge, is the zero graduation, while the normal position of the temperature indicating hand, that is when the temperature is less than 165 degrees F., is at the 165 degree graduation.

From the foregoing, it will be obvious to those skilled in the art that when the gauge is subjected to the influence of water vapor without air content, the pressure hand 2 and the temperature hand 3 will exactly coincide with each other, regardless of whether the pressure is negative or positive and regardless of the temperature. However, should air be present in the water vapor, the hands 2 and 3 will assume an angular relation. This angular relation is an indiction of the percentage of air content in the mixture of water vapor and air, this being due to the fact that the pressure of a mixture of air and water vapor is always above that of pure water vapor at the same temperature, and this in turn is because the pressure of the mixed vapor is equal to the sum of the pressures of the water vapor and the air.

To graphically indicate percentage of air content represented by this variable relation or disparity between the hands when air is present in the water vapor, I lay off, Figure 2, radial lines corresponding to various pressure graduations and then locate on the scale circle 8 points B representing the temperatures of mixtures of water vapor and air, in relative positions to the pressure graduations 10 and 11 corresponding to the relations of temperatures and pressures found on the saturated mixtures of air and water vapor tables or curves. The chordal distances on the scale circle between these points B and the respective pressure graduations 10 are then laid off as by a compass from the scale circle inwardly on the respective radial lines A. For example, I find from the table or curve what is the temperature corresponding to two inches of mercury pressure of a mixture of air and water vapor with twenty percent air content. This temperature is approximately 208 degrees F., and accordingly I make a point on the scale circle corresponding to 208 degrees. I then measure off on the radial line A corresponding to the two inches of mercury graduation, a distance from the scale circle equal to the chordal distance between said pressure graduation and said point representing 208 degrees which locates a point C. This operation is repeated for various percentages of air content which it is desired to graphically indicate so that a plurality of points C on different pressure radii are produced. For instance I may next find from the table or curve the temperature corresponding to four inches of mercury pressure of a mixture with twenty percent air content and lay off another point C on the radial line corresponding to the four inches of mercury graduation in the manner above described; and next I may take the temperature corresponding to two inches of mercury pressure of a mixture with thirty-three percent air content, and so on. The corresponding points C on the various radii are then connected into smooth curves F which represent the percentages of air content in a mixture of water vapor and air. These curves are designated in any suitable manner to show the percentage which they represent, for instance 20, 33, 43, 50, etc., and it will be seen that they are actually the curves found on the saturated mixtures of air and water vapor curves laid off on a base circle which here is the scale circle 8.

In reading the gauge, assuming that there is air mixed with the water vapor and it is desired to ascertain the percentage of air, the hands 2 and 3 will be at a certain angular relation to each other, for example as shown by dot and dash lines in Figure 1 and in Figure 7. The reader notes with his eye the chordal distance between the points of intersection of the two hands with the scale circle 8, as indicated at G, and measures or lays off this distance upon the pressure hand 2 inwardly from the scale circle, as indicated at H. The curve F nearest to the point on the hand 2 where the imaginary line so laid off ends, is indicative of the percentage of the air content; for example, in Figure 7 the percentage of air content is 43. Obviously, the pressure and the temperature may be read directly from the scale circle 8 by the respective hands 2 and 3.

I have described the disparaties or differences between the pressure and the temperature as laid off on pressure radii on the dial to locate the points determining the curves F, and have used chordal distances on the scale circle, since it is preferable to use the pressure radii, and chordal distances are more easily carried in the eye than arcuate distances. However, I might use radii of the temperature graduations in which case the distances on the scale circle between the respective temperature radii and points corresponding to the respective pressures would be laid off on the temperature radii; and arcuate distances might be used. While I have illustrated only seven curves indicating seven different percentages of air content, it will be understood that this is merely for the purposes of illustration and that more or less curves may be laid off in the same manner as described.

To facilitate in reading the gauge the pressure hand may be a little longer than the temperature hand or of a different color, although this is not necessary, since the temperature hand can never travel ahead of the pressure hand as the temperature of the mixture of water vapor and air is always below that of pure water vapor.

As above indicated, any suitable mechanisms may be utilized for actuating the pressure hand 2 and temperature hand 3, but for the purpose of illustration I have shown the pressure hand as actuated by a Bourdon tube 15 having one end fixedly connected to the bracket 5 which has a screw threaded end 16 adapted to be fitted into a correspondingly threaded opening in a steam boiler or pipe connection or other container and which is formed with an opening 17, Figure 5, to establish communication between the container and the Bourdon tube. The free end of the Bourdon tube is connected by a link 18 to a quadrant lever 19 pivotally mounted intermediate its ends as at 20 on the frame 6, 6ª, the quadrant meshing with a pinion 21 fast on the spindle 4. Obviously, the Bourdon tube 15 will be expanded or contracted under pressure and through the link 18 will oscillate the quadrant lever 19 so as to rotate the spindle 4 and move the hand 2 over the scale circle 8. The quadrant lever is influenced into normal position by the Bourdon tube which will locate the hand 2 at the zero graduation. By means of a spiral spring 22 all back-lash or lost motion in the mechanism is maintained in one direction. This construction generally is known in the art.

The temperature hand 3 is shown as actuated by a thermostatic strip 24 having one end fixedly secured as at 25 in a well or recess 26 formed in the bracket 5, and the other end secured to one end of a bar 27 which is formed with two spaced ears or lugs 28 in which is swivel-mounted an adjusting screw 29 upon which is threaded a pivot block 30. A link 31 has one end pivotally connected to the block 30 as at 32 and the other end of said link has a pin and slot connection 33 with a second quadrant lever 34 pivotally mounted intermediate its ends as at 35 on the frame 6ª, 6ᵇ. The quadrant lever 34 carries at its other end a quadrant 37 which meshes with a pinion 38 fast on the sleeve 7 on which is mounted the temperature hand 3. With this construction, when the gauge is secured to a container the thermostatic strip 24 is disposed within the container so as to be responsive to temperature therein and the free end of the thermostatic strip upon expansion and contraction of the strip will swing so as to swing the quadrant lever 34. The quadrant lever 34 is influenced into its normal position to locate the hand 3 at the 165 degree F. graduation on the scale circle, by means of a return spring 39 which influences the quadrant against a stop 23. Necessary adjustments between the pivotal connections 32 and 33 may be made by rotation of the adjusting screw 29 so that the relation of the swinging end of the thermostatic strip and the temperature hand 3 may be properly correlated.

It will be noted that the temperature graduations on the scale circle are variable, that is they are farther apart as they approach the boiling point, since they correspond to the temperatures at the respective pressures in the steam tables or steam curve. It is therefore necessary that the temperature hand 3 move in accordance with this variable increment scale, and this result is accomplished by the particular construction of operating mechanism including the link 31 and the angular relations of the pivotal connections 35, 33 and 32. In other words, the link 31 is such and the said pivotal connections are so arranged that the temperature hand 3 is moved at a gradually increasing velocity from the 165 degree graduation and in accordance with the distances between the various temperature graduations.

One way of accomplishing this result is to consider the problem from the standpoint of a constant velocity ratio in one path, the horizontal movement of the upper end of the bar 27, producing a variable velocity ratio in another path, that of pivot 33. Obviously the pivot 33 must move in an arc about the pivot 35 and this arcuate movement has a constant horizontal component due to the movement of the bar 27, and a vertical component, so that by trigonometrical calculation the instantaneous movement of said pivot 33 about the pivot 35 may be found.

First it is necessary to know the initial or setting angle of the quadrant 34 which a line through 33 and 35 makes to the vertical line 5—5 when the temperature hand points to 165 degrees F., and the final angle or the angle assumed by the quadrant at the end of the movement necessary to actuate the hand 2 as described, which is the angle between line 5—5 and a line passing through points 33 and 35 when the temperature hand is at 212 degrees F. These angles may be found by first ascertaining the angle of operation of the quadrant, that is the angle of its movement from initial setting position to the end of its movement. This may be done by first determining the degree of arc through which the temperature hand 2 must move from the 165 degree graduation to the 212 degree graduation on the scale circle 8. By dividing this arc, which is approximately 228 degrees, by the gear ratio of the quadrant 37 and the pinion 38, the angle of arc through which the quadrant lever 34 must be moved to actuate the temperature hand through said arc of 228 degrees, is ascertained. This angle is of course the difference between the final angle, which we may designate X, and the setting angle, Y. Obviously, the angles X and Y bear to each other the same ratio as the length of the arc of movement of the hand 2 for one degree of temperature at 166 degrees F., for which may stand P, bears to the length of arc for one degree of temperature at 211 degrees F., represented by PP, because the difference in temperature are both 1 degree F. which are constant horizontal velocity ratios due to the constant velocity ratio of the upper end of the bar 27 which moves constantly with each single degree increment of temperature of the thermostatic strip 24.

The lengths of said arcs P and PP bear to each other the same ratio as does the difference in the pressures corresponding to temperatures of 165 degrees and 166 degrees, bear to the difference in the pressures corresponding to temperatures of 211 degrees and 212 degrees. The two angles X and Y desired being those whose difference is X minus Y, which is known as above described, and which have the same ratio to each other as do the arcs P and PP, from this equation and trigonometrical calculations the angles X and Y may be computed.

Should it be desirable for any reason to have the temperature range increment on the scale uniform, this can be accomplished by plotting or laying out on the dial the curve corresponding to zero percent of air content and then adding the other air percentage curves in the same manner as above described.

Preferably the well 26 is filled with a substance which will liquefy at about 150 degrees F. and will not boil under 300 degrees F. and which is solid below 150 degrees F., for example, candelilla wax or carnauba wax. This substance rapidly communicates heat from the walls of the well to the thermostatic strip, and being hard under a temperature of 150 degrees F. serves to rigidly hold the thermostatic strip and its connecting parts against movement or vibration during transportation or handling of the gauge. Also, this substance being solid at normal weather temperatures, will not run out of the open top of the well 26 when the gauge is positioned other than vertically with open side up during transportation or handling.

Instead of the thermostatic strip 24 I may utilize any other suitable means responsive to temperature for actuating the temperature hand 3, for example the so-called "vapor tension system" which includes a vapor expansible under the influence of heat and enclosed in a container or chamber with means for transmitting motion induced by the expansion of said fluid to the hand 3 or other indicating means.

It will be understood from the foregoing that the underlying principle of the invention is the graphical or visual indication of departures from normal of one of a plurality of dependent variable conditions which have a normal definite relation, by graphically or visually indicating each of the other variable conditions and the variations thereof due to variations in the first-mentioned condition. Specifically, the variations in the percentage of the air content of a mixture of air and water vapor are visually indicated by visually indicating the variations from normal relation of the temperature and the pressure of the mixture which are due to variations in the amount of air present. Any suitable type of indicating members relatively movable over a common path may be used in combination with any suitable scale of graduations.

Having thus described the invention, what I claim is:

1. A gauge for indicating air content in a mixture of water vapor and air, comprising means movably responsive to variations in temperature of said mixture, means movably responsive to variations in the pressure of said mixture and having normally a definite relation to said temperature responsive means, whereby changes in said relation indicate variations in the amount of air in said mixture, said responsive means each including a movable indicating member, and the gauge being provided with a dial or chart having a scale to cooperate with both said members and containing temperature graduations and pressure graduations arranged in relations corresponding to those of the actual respective temperatures and pressures of a pure water vapor, said dial or chart also having a plurality of curves each representing a certain percentage of air content in a mixture of water vapor and air so that the curve nearest the point on one of said indicating members at a distance from said scale equal to the distance between said two indicating members is indicative of the approximate percentage of air in the mixture.

2. A gauge for indicating air content in a mixture of water vapor and air, comprising a hand or pointer, means for moving the same in response to variations in temperature of said mixture, a second hand or pointer movable co-axially with and relatively to the first pointer, means for moving said second hand or pointer in response to variations in the pressure of said mixture so that said second hand coincides in position and is movable with said first hand when no air is present in said mixture, whereby relative movement and an angular relation of said hands indicate variations in the amount of air in said mixture, and a dial or chart having a scale circle concentric with said hands or pointers to cooperate with both thereof and containing temperature graduations and pressure graduations arranged in circumferentially spaced relations corresponding to those of the actual respective temperatures and pressures of a pure water vapor to indicate the actual temperature and the actual pressure of the mixture being measured and the amount of air contained in said mixture, said dial or chart also having a plurality of curves each connecting a plurality of points each of which is spaced radially inwardly from said scale circle on a different radius corresponding to a pressure graduation a distance equal to that on the scale circle between the corresponding radius and points on said scale circle representing temperatures corresponding to the respective pressures of a mixture of water vapor and air having a certain percentage of air content so that the curve nearest the point on one of said hands or pointers at a distance from said scale circle equal to the distance between said hands or pointers on said scale circle is indicative of the approximate amount of air in said mixture.

3. A gauge for indicating air content in a mixture of water vapor and air, comprising a hand or pointer movable about an axis, means for moving the same responsive to variations in temperature of said mixture, a second hand or pointer movable co-axially with the first, means for moving the second hand or pointer responsive to variations in the pressure of said mixture so that said second hand coincides in position and is movable with said first hand when no air is present in said mixture, whereby relative movement and an angular relation of said hands indicate variations in the amount of air in said mixture, and a dial or chart having a scale circle concentric with said hands or pointers to cooperate with both thereof and containing a series of graduations of temperature conditions and a series of graduations of pressure conditions arranged in circumferentially spaced relations corresponding to those of the actual respective temperatures and pressures of a pure water vapor to indicate the actual temperature and the actual pressure of the mixture being measured and the amount of air contained in said mixture, said dial or chart also having a plurality of curves each determined by a plurality of points each of which is spaced inwardly on a radius corresponding to one graduation of said series of graduations for one of said conditions a distance equal to that on said scale circle between the corresponding graduation and a point on said scale circle representing the magnitude of the other condition corresponding to the magnitude of the condition represented by the first-mentioned point in a mixture of air and water vapor having a certain percentage of air content, so that the curve nearest the point on one of said hands or pointers at a distance from said scale circle equal to the distance between said hands or pointers on said scale circle is indicative of the approximate amount of air in said mixture.

4. A chart for indicating the percentage of air content in a mixture of water vapor and air having a scale circle containing a series of graduations of temperature conditions and a series of graduations of pressure conditions arranged in circumferentially spaced relations corresponding to those of the actual respective temperatures and pressures of a pure water vapor, and a plurality of curves each determined by a plurality of points each of which is spaced inwardly on a radius corresponding to one graduation of said series of graduations for one of said conditions a distance equal to that on said scale circle between the corresponding graduation and a point on said scale circle representing the magnitude of the other condition corresponding to the magnitude of the condition represented by the first-mentioned point in a mixture of air and water vapor having a certain percentage of air content so that the curve nearest the point located by measuring off on any of said radii containing said points a distance equal to that on the scale circle between the particular radius and a given graduation corresponding to the other condition, is indicative of the percentage of air content in a mixture of water vapor and air at the temperature and pressure represented by said radius and said graduation.

5. A chart for indicating the percentage of air content in a mixture of waper vapor and air having a scale line containing a series of graduations representing temperature conditions and a series of graduations representing pressure conditions arranged in spaced relations corresponding to those of the actual respective temperatures and pressures of a pure water vapor, and a plurality of curves each determined by a plurality of points each of which is arranged on a line corresponding to one of said series of said graduations for one of said conditions and spaced from said scale line a distance equal to that on the scale line between the corresponding graduation and a point on said scale line representing the magnitude of the other condition corresponding to the magnitude of the condition represented by the first-mentioned line in a mixture of air and water vapor having a certain percentage of air content.

6. A gauge for indicating air content in a mixture of water vapor and air, comprising means movably responsive to variations in temperature of said mixture, means movably responsive to variations in the pressure of said mixture and having normally a definite relation to said temperature responsive means, whereby changes in said relation indicate variations in the amount of air in said mixture, said responsive means each including a movable indicating member, and the gauge being provided with a dial or chart having a scale line and a plurality of curves each representing a certain percentage of air content in a mixture of water vapor and air so that the curve nearest the point on one of said indicating members at a distance from said scale equal to the distance between said two indicating members is indicative of the approximate percentage of air in the mixture.

HENRY W. CROWELL.